No. 732,166. PATENTED JUNE 30, 1903.
G. J. CALLAHAN.
NUT LOCK.
APPLICATION FILED SEPT. 10, 1902.
NO MODEL.

WITNESSES:

INVENTOR
George J. Callahan
BY
ATTORNEYS

No. 732,166. Patented June 30, 1903.

UNITED STATES PATENT OFFICE.

GEORGE J. CALLAHAN, OF RIFLE, COLORADO.

NUT-LOCK.

SPECIFICATION forming part of Letters Patent No. 732,166, dated June 30, 1903.

Application filed September 10, 1902. Serial No. 122,792. (No model.)

*To all whom it may concern:*

Be it known that I, GEORGE J. CALLAHAN, a citizen of the United States, and a resident of Rifle, in the county of Garfield and State of Colorado, have invented a new and Improved Nut-Lock, of which the following is a full, clear, and exact description.

The object of the invention is to provide a new and improved nut-lock which is simple and durable in construction, cheap to manufacture, easily applied, and arranged to permit of proper screwing up of the nut before securely locking the nut in place.

The invention consists of novel features and parts and combinations of the same, as will be fully described hereinafter and then pointed out in the claim.

A practical embodiment of the invention is represented in the accompanying drawings, forming a part of this specification, in which similar characters of reference indicate corresponding parts in all the views.

Figure 1:
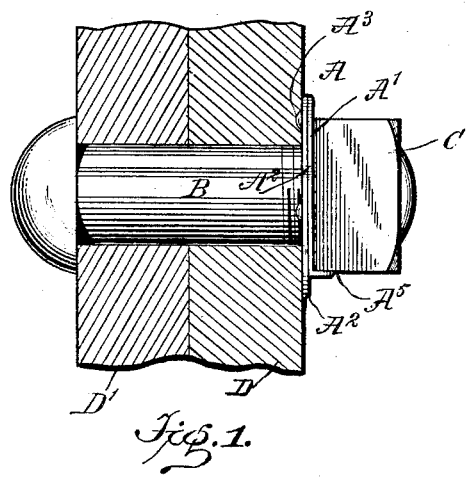
Figure 2:
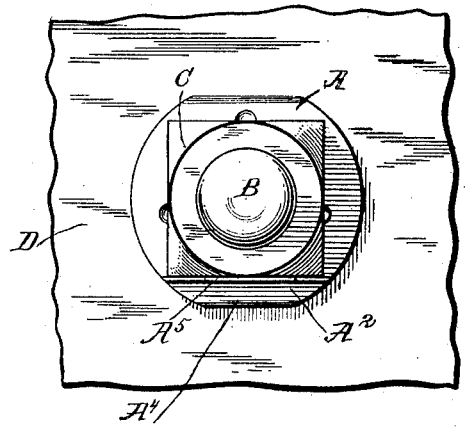
Figure 3:
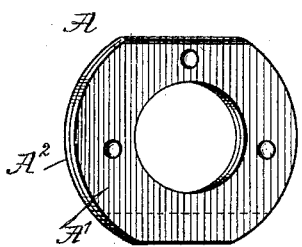

Figure 1 is a side elevation of the improvement as applied, the parts fastened together being shown in section. Fig. 2 is an end view of the same. Fig. 3 is a perspective view of the washer, and Fig. 4 is a transverse section of the same.

The nut-lock consists, essentially, of a washer A, having a central aperture for loosely engaging the bolt B, the outer face of the washer being engaged by the nut C and the inner face of the washer being adapted to rest against the face of the part D, which is to be bolted to the part D'. The washer A is preferably made of a piece of sheet metal doubled up to form a front plate A' and a rear or back plate $A^2$, of which the latter is provided on its rear face with lugs $A^3$, adapted to engage indentations or recesses in the face of the part D in case the latter is made of metal or to embed themselves in the face of the part D in case the latter is made of wood. The free ends of the doubled-up plates A' and $A^2$ are formed with inside bevels $A^4$, as plainly illustrated in Fig. 4, to allow of conveniently inserting a chisel or the like to enable the operator to bend the engaged portion of the front plate A' outward into an angular position to form a lip $A^5$ for engaging one side of the nut C to lock the latter in place after the parts are fastened together. The washer A is in its main portion circular, as indicated in Figs. 2 and 3, the doubled-up ends, as well as the free ends, being straight and parallel with each other, as will be readily understood by reference to the said figures.

Figure 4:
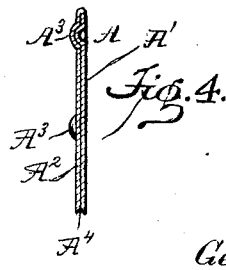

In using the washer it is applied on the bolt B with the front and back plates A' and $A^2$ in the positions shown in Figs. 3 and 4. The nut C is then screwed up to press the washer in firm contact with the part D and to engage the lugs $A^3$ with the part D, as previously explained, to prevent the washer from turning. When the nut C has been fully screwed up, the operator inserts a chisel between the beveled edges $A^4$ to form a portion of the front plate A' into the lip $A^5$, engaging one side of the nut C. Thus the nut is held against turning by the lip $A^5$ and the washer is held against turning by the lugs $A^3$.

From the foregoing it is evident that neither the bolt nor the nut require special treatment, as the improved washer can be applied to any ordinary bolt and nut now generally in use.

Having thus described my invention, I claim as new and desire to secure by Letters Patent—

A nut-lock, comprising a washer made of a piece of sheet metal bent upon itself to form a front and back plate; and projections struck inwardly upon said washer through both of its plates to engage the surface of the part with which its inner side contacts, and to lock the two plates of the washer against movement upon each other, the front plate having a part adapted to be turned up into engagement with one side of the nut.

In testimony whereof I have signed my name to this specification in the presence of two subscribing witnesses.

GEORGE J. CALLAHAN.

Witnesses:
RICHARD PARRIS,
CHARLES H. PARRIS.